July 8, 1969 R. J. URBA ET AL 3,454,841

NEUTRALIZED SOLID-STATE RECTIFIER

Filed March 20, 1967

INVENTORS.
RICHARD J. URBA
EDWARD D. SEMRAI

BY [signature]

ATTORNEY

United States Patent Office 3,454,841
Patented July 8, 1969

1 2

3,454,841

NEUTRALIZED SOLID-STATE RECTIFIER

Richard J. Urba, Wayne, N.J., and Edward D. Semrai, Woodstock, N.Y., assignors to Electronic Devices, Inc., Yonkers, N.Y., a corporation of Delaware Filed Mar. 20, 1967, Ser. No. 624,490
Int. Cl. H01l 5/00
U.S. Cl. 317—234 9 Claims

ABSTRACT OF THE DISCLOSURE

A neutralized rectifier cartridge wherein a stack of solid-state cells are contained within an insulating casing which is enclosed by end caps, a conductive slug being interposed between one of said caps and the stack to provide a capacitative connection to a contoured conductive layer secured to the outer surface of the casing, the layer forming neutralizing capacitors with respect to said cells.

This invention relates generally to high-voltage, solid-state rectifiers, and more particularly to a rectifier of the cartridge type constituted by a stack of diode cells and incorporating means to neutralize the adverse effects of distributed capacity, as well as to provide a heat sink improving the operating efficiency of the device.

Solid state rectifiers are currently available as a substitute for conventional vacuum tube rectifiers for radio and television receivers, and in various other applications requiring the conversion of alternating into direct current. Solid-state rectifiers offer the advantages of greater compactness, less production of heat, longer life, and immediate operation.

The trend toward completely transistorized amplifiers, receivers and other electronic devices operating from an alternating-current power line has markedly increased the commercial importance of solid-state rectifiers, for only by the use of such rectifiers is it possible to build portable electronic apparatus composed entirely of solid-state, heater-free elements. Individual rectifier cells have a relatively low voltage rating and it is the practice, therefore, in high-voltage rectification, to stack a series of cells to form a cartridge having a high-voltage rating.

In a television receiver, the operation of the cathode ray display tube requires an accelerating voltage of about 18,000 volts. This voltage is obtained by rectifying the rapid flyback voltage produced at the end of each scanning stroke. The line frequency generator for television receivers supplies a high-frequency voltage, and to produce the direct-current accelerating voltage, the flyback voltage is stepped up in a transformer whose output is rectified. Conventionally, such rectification is effected by diode tubes.

With the reduction in component space in modern TV receivers, attempts have been made to replace the diode tubes with solid-state, cartridge-type rectifiers using silicon or selenium cells. It has been found, however, that standard solid-state rectifiers having the proper voltage rating for low-frequency, A-C rectification, are unsuitable for rectifying high-frequency flyback voltages, for these rectifiers tend to fail in operation. The reason for such failure is the distributed or stray capacities in solid-state rectifiers which give rise to excessive current flow in some of the cells.

Solid-state rectifiers for high voltages consist essentially of a stack of diode cells all facing in the same direction and forming a column, the number of cells contained in the column depending on the high-voltage rating of the rectifier. In a high-voltage rectifier system, there always exists some distributed or parasitic capacity between the rectifier cells which are serially connected through one side of the high-voltage line, and the return side of the line.

When the series-connected cells pass current in the forward direction from the A-C source to the load, these distributed capacities are of little consequence, for during the half-cycle of the A-C wave, the voltage drop across the cells is quite low, in the order of a few volts. But during the other half-cycle, when the voltages are impressed on the cells in the reverse or blocking direction, small currents pass through the cells due to distributed capacity.

Since some of the cells are closer to the A-C supply, the capacity currents through these cells are greater than through those adjacent the load. Consequently, the voltages across the cells will vary considerably, causing those closer to the A-C supply to receive much higher inverse voltages which overload these cells and cause breakdown of the rectifier. Obviously, the breakdown of any one cell or of a number of cells in the cartridge seriously impairs the continued operation of the rectifier.

Accordingly, it is the main object of this invention to provide a solid-state stacked rectifier cartridge incorporating neutrilizing means to compensate for the effects of distributed capacity, thereby preventing failure of the rectifier. A significant advantage of the invention is that it enables one to use rectifier cells having lower peak inverse voltage ratings in a series string arrangement.

More specifically, it is an object of this invention to provide a rectifier cartridge wherein the neutralizing means is constituted by a contoured conductive layer secured to the outer surface of the insulating casing of the cartridge and capacitatively coupled to the input terminal of the rectifier through a slug contained within said casing, the slug not only serving to couple the layer and doing away with the need for a direct connection, but also functioning as a heat sink to prevent an excessive rise in the temperature of the cartridge.

Also an object of the invention is to provide a low-cost, efficient and reliable solid-state rectifier which is adapted to supplant diode tube rectifiers in accelerating voltage circuits for television cathode ray tubes. The use of a solid state rectifier stack in place of a diode tube not only provides a longer rectifier life, but also eliminates the need for a heater winding on the line transformer. On the other hand, a solid-state stack must be operated within safe temperature limits, and the slug which is included in the cartridge, since it functions as a heat sink, prevents overheating thereof.

Briefly stated, these objects are accomplished in a solid-state rectifier cartridge having a stack of diode cells contained within an insulating casing having end caps thereon, a metal slug being interposed between one end cap and the first cell in the stack and being urged thereagainst to provide an effective electrical connection between said one cap and the series of cells, the last cell in the stack engaging the other end cap.

Secured to the outer surface of the case is a contoured conductive layer, preferably in the form of a metal foil having a hyperbolic shape, the layer being so positioned as to be capacitively coupled at its end portion to the slug and hence effectively connected to said one end cap, the main body of the layer being capacitatively coupled to the cells closest to said one end cap to provide capacitances whose values substantially neutralize the distributed capacity of these cells and thereby minimize the flow of destructive capacity currents therein.

For a better understanding of the invention, as well as other objects and further features thereof, reference is made to the following detailed description to be read in conjunction with the annexed drawing wherein.

Figure 1:
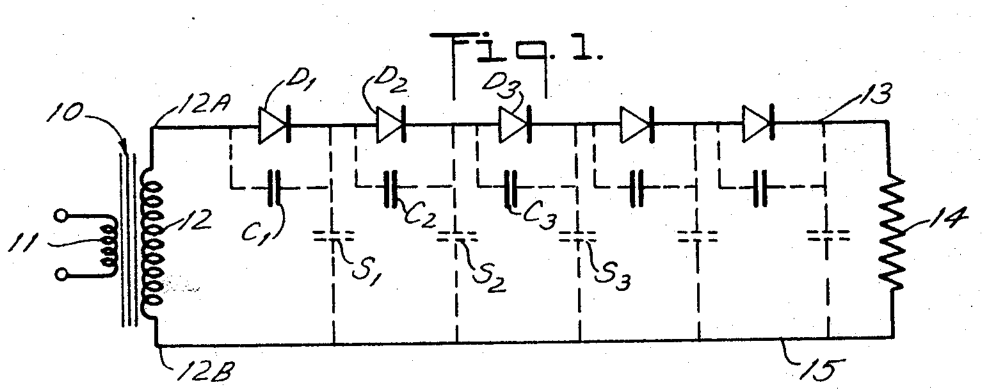
FIG. 1 is a schematic electrical circuit of a high-voltage supply including a conentional cartridge-type rectifier.

Referring now to FIG. 1, there is shown a rectified high-voltage supply which includes a step-up transformer 10 having a primary winding 11 connected to an A-C source, such as the flyback circuit of a TV receiver, and a secondary winding 12. One terminal 12A of the secondary winding is connected by line 13 through a rectifier constituted by serially connected solid-state diodes $D_1$, $D_2$, $D_3$, etc., to one side of a load 14, the other side thereof going through a return line 15 to the other terminal 12B of the secondary winding. Filter means may be provided in the output of the rectifier, but this forms no part of the invention.

The diodes are of the solid-state type constituted by a stack of blocking-layer selenium or junction-type silicon cells. Each cell therefore has an internal capacitance which is represented by capacitors $C_1$, $C_2$, $C_3$, etc., bridged across the corresponding diode.

Because of the fact that the return conductor must be mounted in some position adjacent the series of cells in the stack thereof, distributed or stray capacities are inevitably present, these being represented in the drawing by capacitors $S_1$, $S_2$, $S_3$, etc. It will be appreciated that if the distributed capacities are disregarded, and assuming that the internal capacities $D_1$, $D_2$, $D_3$, etc. of the diodes are of almost equal value, as should actually be the case, the inverse voltage across the series-connected diodes will be about the same for each of the diodes.

The distributed capacities $S_1$, $S_2$, $S_3$, etc., however, are not always of equal value, and when the voltage is in the reverse half of the A-cycle, small-capacity currents pass from the return line 15 through these capacities into the diodes, so that the inverse voltages therein are no longer equal.

In operation, the capacity current through capacitor $S_3$ passes serially through diodes $D_3$, $D_2$, and $D_1$, the current through capacitor $S_2$ serially through diodes $D_2$ and $D_1$, while that through capacitor $S_1$ only through diode $D_1$. Hence diode $D_1$ is subjected to the combined currents from all three distributed capacities. While only three of the diodes in the chain have been analyzed, the same effect applies to all of the diodes.

It will be obvious, therefore, that the diodes nearest the load 14 pass current of relatively small value, whereas as one goes closer to the transformer, increasingly greater capacity currents are encountered. Because of the addition of currents, the voltages across the diodes close to the transformer have much higher inverse values than any of the other diodes in the series circuit. The diodes closest to the transformer may therefore be overlooked and subject to breakdown.

In order to neutralize the distributed capacity currents, the invention provides a neutralizing network constituted by neutralizing capacitors $N_1$, $N_2$, $N_3$, etc., along at least the front portion of the series diode chain, one for each diode. Each of these capacitors is coupled from its associated diode through a common coupling capacitor 16 to terminal 12A of the secondary winding, capacitor 16 having a capacitance which is large relative to those of the neutralizing capacitors and effectively providing a direct connection to this terminal.

The values of neutralizing capacitors $N_1$, $N_2$, $N_3$, etc., vary progressively, the first being largest, so as to balance out the relatively heavy capacity current flowing in the first diode $D_1$. By the use of neutralizing capacitors along the entire diode chain, each having an appropriate value relative to the distributed capacity, optimum compensation may be obtained so that the inverse voltage across each diode is substantially equal. But since as a practical matter, only the diodes close to the A-C input require compensation to avoid overload, it is not necessary to have neutralizing capacities for the diodes adjacent the load.

Figure 3:
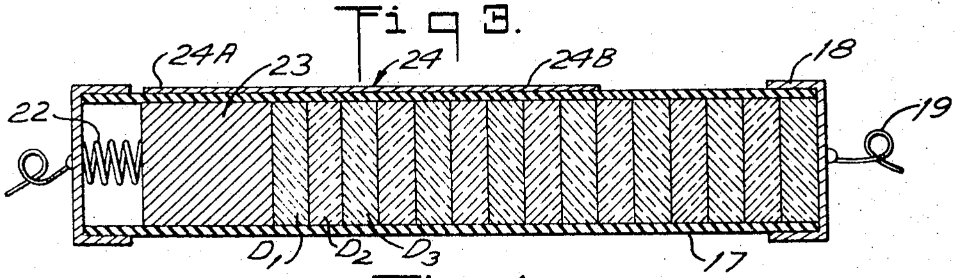
FIG. 3 is a sectional view of a neutralized cartridge in accordance with the invention.
Figure 4:
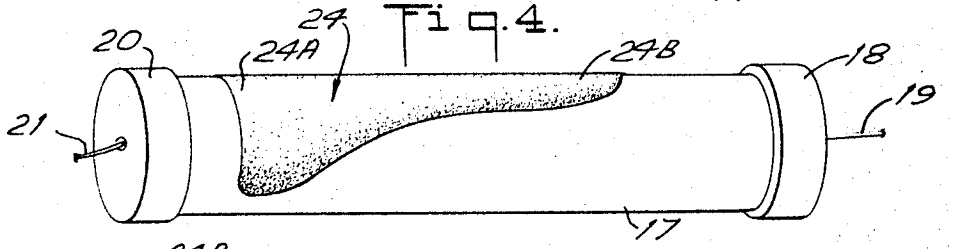
FIG. 4 illustrates the cartridge in perspective.
Figure 5:
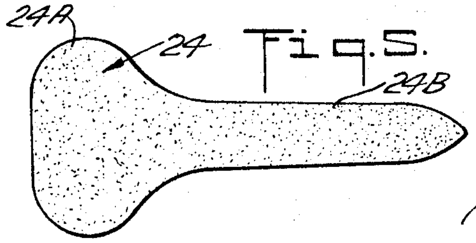
FIG. 5 is a developed view of the form the neutralizing layer may take.

Referring now to FIGS. 3, 4 and 5, there is shown a cartridge-type rectifier which incorporates a neutralizing circuit in accordance with the invention. The cartridge is constituted by a tubular insulating casing 17 having a stack of diode cells $D_1$, $D_2$, $D_3$, etc., forming a column therein, the cells all facing in the same direction, and hence being connected in series.

In practice, the cells may be blocking-layer selenium or junction-type silicon elements. One end of the casing is enclosed by a cap 18 which physically and electrically makes contact with the end cell in the stack. A lead wire 19 is connected to this cap for connecting the rectifier to the load end of the rectifier circuit.

The other end of the casing is enclosed by a cap 20 having a lead wire 21 connected thereto for connecting the rectifier to the A-C end of the circuit. Interposed between cap 20 and the front cell $D_1$ in the stack is a helical spring 22 which urges a metal slug 23 against this cell. Both the spring and slug, as well as the end caps, are made of conductive metal, such as brass, to provide a good connection between the caps and the stack of cells. The slug is cylindrical in form, and may be of hollow or solid metal, the slug being dimensioned to telescope within the casing.

Attached to the outer surface of casing 17 is a contoured layer 24 of conductive material in the form of a metal foil, paint, ink, etc. As shown in the developed form in FIG. 5 the layer has a relatively broad end portion 24A and a tapered main body portion 24B whose contours follow a hyperbolic curve. In practice, other contours may be used to provide appropriate neutralizing values.

Figure 2:
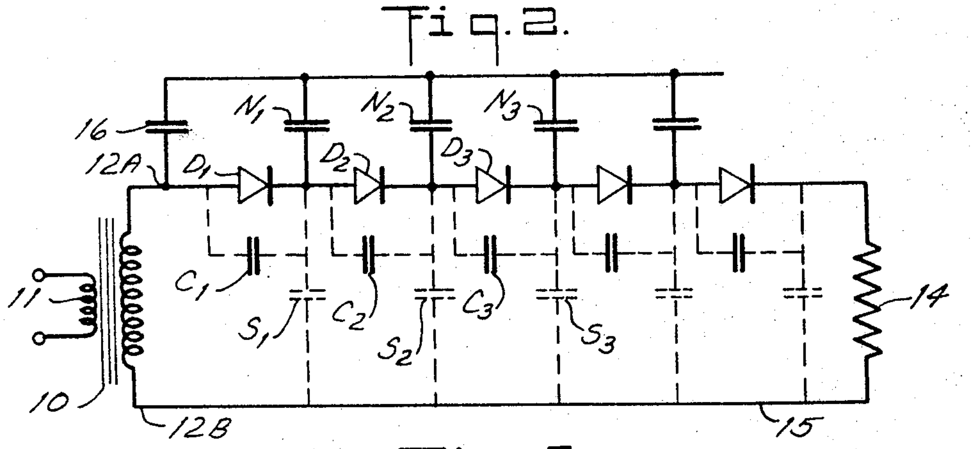
FIG. 2 is the same circuit having added thereto neutralizing means in accordance with the invention.

End portion 24A surrounds the insulating casing in the area thereof encompassing slug 23, thereby forming the common coupling capacitor 16 of FIG. 2, one electrode of which is the end portion and the other being the slug. Main body portion 24B of the layer surrounds casing 17 about the region thereof containing those diode cells in the stack which are closest to the A-C side of the circuit. Hence each section of the main body portion defines a neutralizing capacitor with the corresponding positioned cell, each capacitor having a value determined by the area of the related section. Since main body portion 24B diminishes in area as one moves away from the end portion, the neutralizing capacitors which are defined thereby are of progressively reduced value. In practice, the layer is contoured so as to provide the capacity values appropriate to the rectifier structure.

Slug 23 serves three functions, for it not only acts as an electrode in the common coupling capacitor, but it also provides a good electrical connection with the front of the stack through the associated spring 22 and end cap 20, as well as serving as a heat sink to absorb heat generated within the stack. Since the stack tends to rise in temperature in the course of operation, the heat sink prevents a rise beyond the safe operating limits of the rectifier.

While there has been shown and described a preferred embodiment of neutralized solid-state rectifier in accordance with the invention, it will be appreciated that many changes and modifications may be made therein without, however, departing from the essential spirit of the invention as defined in the annexed claims.

What we claim is:

1. A neutralized rectifier cartridge comprising:

(a) an insulating tubular casing, (b) a stack of solid-state diode cells forming a column within said casing, said cells being serially connected, (c) end caps enclosing said casing, one cap being engaged by the rear end of said column, the column being shorter than said casing to produce a space between the front end of the column and the other cap, (d) a conductive slug disposed in said space, (e) conductive spring means in said space urging said slug against the front end of the column and providing an electrical connection between said other cap and said front end, said slug acting as a heat sink to absorb heat generated by said stack of cells, and (f) a conductive layer secured to the outer surface of said casing, said layer having an end portion forming an electrode of a coupling capacitor whose other electrode is said slug, and having a main body portion whose sections form neutralizing capacitors with the correspondingly positioned cells in said column, the dimensions of said end portion and said slug providing a capacitance value for said coupling capacitor which is large, relative to those of said neutralizing capacitors, thereby effectively providing a direct connection between said other end cap and said layer.

2. A cartridge as set forth in claim 1, wherein said cells are blocking-layer selenium cells.

3. A cartridge as set forth in claim 1, wherein said cells are junction-type silicon cells.

4. A cartridge as set forth in claim 1, wherein said layer is formed of metal foil.

5. A cartridge as set forth in claim 1, wherein said layer is formed of metallized paint.

6. A cartridge as set forth in claim 1, wherein said layer is formed by a conductive film coated on said casing.

7. A cartridge as set forth in claim 1, wherein said main portion of said layer is tapered along a hyperbolic curve.

8. A cartridge as set forth in claim 1, wherein said neutralizing capacities have values which compensate for distributed capacity effects.

9. A neutralized rectifier cartridge comprising:

(a) an insulating tubular casing, (b) a stack of solid-state rectifier cells in said casing forming a column therein, said column being shorter than said casing to provide an end space therein, (c) a conductive slug disposed in said end space, one end of said slug engaging the front end of said column, (d) a terminal connected to the other end of said slug and thereby being connected to the front end of said column, (e) a terminal connected to the rear end of said column, and (f) a conductive layer secured to the outer surface of said casing, said layer having a portion forming an electrode of a coupling capacitor whose other electrode in said slug, the remaining portion of said layer forming neutralizing capacities with the cells in the column.

References Cited

UNITED STATES PATENTS

| | | | |
|---|---|---|---|
| 3,290,516 | 12/1966 | Nishizawa | 317—234 X |
| 3,319,136 | 5/1967 | Perry et al. | 317—234 |
| 3,346,784 | 10/1967 | Blake | 317—234 |
| 3,373,335 | 3/1968 | Rosenberg | 321—11 |
| 3,373,336 | 3/1968 | Schillmann et al. | 321—11 |

FOREIGN PATENTS

| | | |
|---|---|---|
| 1,003,102 | 9/1965 | Great Britain. |
| 1,381,906 | 11/1964 | France. |

JOHN W. HUCKERT, *Primary Examiner.*

R. F. POLISSACK, *Assistant Examiner.*

U.S. Cl. X.R.

317—235